(12) United States Patent
Bingham et al.

(10) Patent No.: US 9,114,984 B2
(45) Date of Patent: Aug. 25, 2015

(54) SYSTEM AND PROCESS FOR UPGRADING HYDROCARBONS

(75) Inventors: Dennis N. Bingham, Idhao Falls, ID (US); Kerry M. Klingler, Idaho Falls, ID (US); Joseph D. Smith, Owasso, OK (US); Terry D. Turner, Idaho Falls, ID (US); Bruce M. Wilding, Idaho Falls, ID (US)

(73) Assignee: Battelle Energy Alliance LLC, Idaho Falls, ID (US)

( * ) Notice: Subject to any disclaimer, the term of this patent is extended or adjusted under 35 U.S.C. 154(b) by 401 days.

(21) Appl. No.: 13/532,540

(22) Filed: Jun. 25, 2012

(65) Prior Publication Data
US 2013/0341244 A1   Dec. 26, 2013

(51) Int. Cl.
*C10G 49/00* (2006.01)
*C10G 73/44* (2006.01)
*C10J 3/57* (2006.01)
*C01B 3/34* (2006.01)

(52) U.S. Cl.
CPC ............. *C01B 3/348* (2013.01); *C10G 49/007* (2013.01); *C10G 73/44* (2013.01); *C10J 3/57* (2013.01); *C01B 2203/0216* (2013.01); *C01B 2203/0805* (2013.01); *C01B 2203/1235* (2013.01); *C01B 2203/1252* (2013.01); *C10J 2300/16* (2013.01)

(58) Field of Classification Search
None
See application file for complete search history.

(56) References Cited

U.S. PATENT DOCUMENTS

| | | | |
|---|---|---|---|
| 3,941,681 A | 3/1976 | Saegusa et al. | |
| 3,948,759 A | 4/1976 | King et al. | |
| 4,092,236 A | 5/1978 | Heredy | |
| 5,177,304 A * | 1/1993 | Nagel | 588/314 |
| 8,685,281 B2 | 4/2014 | Bingham et al. | |
| 2011/0089377 A1 | 4/2011 | Bingham et al. | |
| 2013/0020232 A1 | 1/2013 | Turner et al. | |
| 2013/0020236 A1 | 1/2013 | Turner et al. | |

FOREIGN PATENT DOCUMENTS

| | | | |
|---|---|---|---|
| CA | 2612958 A1 | 6/2008 | |
| DE | 4325524 A1 * | 3/1994 | |

OTHER PUBLICATIONS

Machine Translation of DE 43 25 524 A1 (Mar. 1994).*
PCT International Search Report for PCT International Patent Application No. PCT/US2013/044107, mailed Aug. 21, 2013.

* cited by examiner

*Primary Examiner* — Jennifer A Leung
(74) *Attorney, Agent, or Firm* — Holland & Hart, LLP

(57) ABSTRACT

In one embodiment, a system for upgrading a hydrocarbon material may include a black wax upgrade subsystem and a molten salt gasification (MSG) subsystem. The black wax upgrade subsystem and the MSG subsystem may be located within a common pressure boundary, such as within a pressure vessel. Gaseous materials produced by the MSG subsystem may be used in the process carried out within the black wax upgrade subsystem. For example, hydrogen may pass through a gaseous transfer interface to interact with black wax feed material to hydrogenate such material during a cracking process. In one embodiment, the gaseous transfer interface may include one or more openings in a tube or conduit which is carrying the black wax material. A pressure differential may control the flow of hydrogen within the tube or conduit. Related methods are also disclosed.

18 Claims, 5 Drawing Sheets

US 9,114,984 B2

SYSTEM AND PROCESS FOR UPGRADING HYDROCARBONS

GOVERNMENT RIGHTS

This invention was made with government support under Contract Number DE-AC07-05ID14517 awarded by the United States Department of Energy. The government has certain rights in the invention.

TECHNICAL FIELD

The present invention relates to the upgrading of hydrocarbons and, more particularly, to systems and methods for upgrading long chain hydrocarbons such as, for example, hydrocarbons known as Uinta Black Wax, to provide a lighter, more easily transportable form of the hydrocarbon material.

BACKGROUND

Hydrocarbon based fuels (including petroleum products, natural gas, etc.) have been, and remain, a major source of global energy production. Projections of global oil reserves and a variety of other issues have motivated individuals, companies and governments to research possible energy production alternatives. These research and development efforts have included the search for improved techniques, systems and methods for producing energy from existing, known energy sources. For example, efforts have been made regarding the ability to extract oil located in geophysical locations that are difficult to reach using conventional technology. Additionally, efforts have been made to make existing energy processes more efficient, more cost effective, and more environmentally friendly.

Other efforts have focused on extracting energy from reserves that have largely been ignored in the past. In some cases, these resources or reserves have been ignored because they are not as carbon rich as other available resources. In other instances it is simply more difficult to convert the resource into a useable form of energy. For example, substantial efforts have been made to extract oil from sources such as tar sands and oil shale. While technically feasible, extraction of oil from such sources in the past has conventionally been considered inefficient and ecologically unfriendly.

Moreover, because the uncertainty of the world economy is heavily influenced by the energy sector, the ability to provide additional, alternative sources of energy becomes desirable for any nation. The mantra for fusing multiple sources of energy for use by an existing yet changing infrastructure is a lofty if not the primary goal of the industry. Thus, making more effective use of existing resources is an important piece of this puzzle as are new resources and new technologies.

As such, it is an ongoing desire to provide new sources of energy, to improve energy extraction efforts, and to improve existing processes and techniques so as to provide energy more efficiently, more abundantly, and in a more environmentally friendly manner.

BRIEF SUMMARY OF THE INVENTION

In accordance with one aspect of the present invention, a system is provided for upgrading hydrocarbon material. The system includes a black wax upgrade subsystem and a molten salt gasification (MSG) subsystem, wherein the black wax upgrade subsystem and the MSG subsystem are contained within a common pressure boundary. A gaseous transfer interface is located between the black wax upgrade system and the MSG subsystem. In one embodiment, the MSG subsystem includes a volume of molten salt and a vapor chamber located above the volume of molten salt. The system may also include a heating subsystem configured to provide heat to at least the MSG subsystem. Such a heating subsystem may further include a burner and a boiler. In one embodiment, the boiler substantially surrounds the volume of molten salt.

In one particular embodiment, the black wax upgrade subsystem includes coiled tubing located within the vapor chamber of the MSG subsystem. The gaseous transfer interface may be defined, at least in part, by one or more openings in the coiled tubing. In another embodiment, the gaseous transfer interface includes at least one check valve associated with the coiled tubing.

The system may include at least one separator configured to process an output stream from the black wax upgrade subsystem. In one embodiment, the at least one separator is configured to separate a liquid phase from a gaseous phase. In another embodiment, the at least one separator is configured to separate a first gaseous constituent from a second gaseous constituent.

The system may further include a recycle stream from the at least one separator configured to return a fluid material to at least one of the black wax upgrade subsystem and the MSG subsystem.

In accordance with another embodiment of the present invention, a method is provided for upgrading black wax. The method includes performing a molten salt gasification (MSG) process within a defined pressure boundary, and cracking a black wax material within the pressure boundary including using hydrogen produced by the MSG process to hydrogenate the black wax material.

In one embodiment of the method, hydrogenating the black wax material includes flowing the hydrogen from the MSG process through a gaseous transfer interface into the presence of the black wax material. Additionally, cracking a black wax material may include flowing the black wax material through a coiled tubing located within the pressure boundary.

The act of flowing the hydrogen through a gaseous transfer interface may include flowing the hydrogen through at least one opening in the coiled tubing. The method may further include maintaining a pressure inside the coiled tubing at a lower pressure outside the coiled tubing but within the pressure boundary. The coiled tubing may be located within a vapor chamber associated with the MSG process.

The method may further include flowing an upgraded output stream that includes the cracked black wax to a separator. At least two constituents contained in the output stream may be separated from each other. In one embodiment, the separation of the at least two constituents may include separating a sweetened crude output stream from a process vapor stream. The process vapor stream may be subjected to further separation processes to produce various gases including hydrogen. Gases from the product vapor stream may be recycled into the process.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

The present invention is directed to systems and methods for upgrading crude oil to a more usable state. The systems and processes may incorporate the use of elevated temperatures, elevated pressures, hydrogen gas and selected catalysts to break long molecular hydrocarbon chains and hydrogenate the chains to produce a liquid product that is more fluid, more easily transported, and is more suited for use as a refinery feedstock. In certain aspects to the present invention, the high-temperature production of hydrogen may be integrated with the high-temperature, high-pressure upgrading of the hydrocarbon material.

Figure 1:
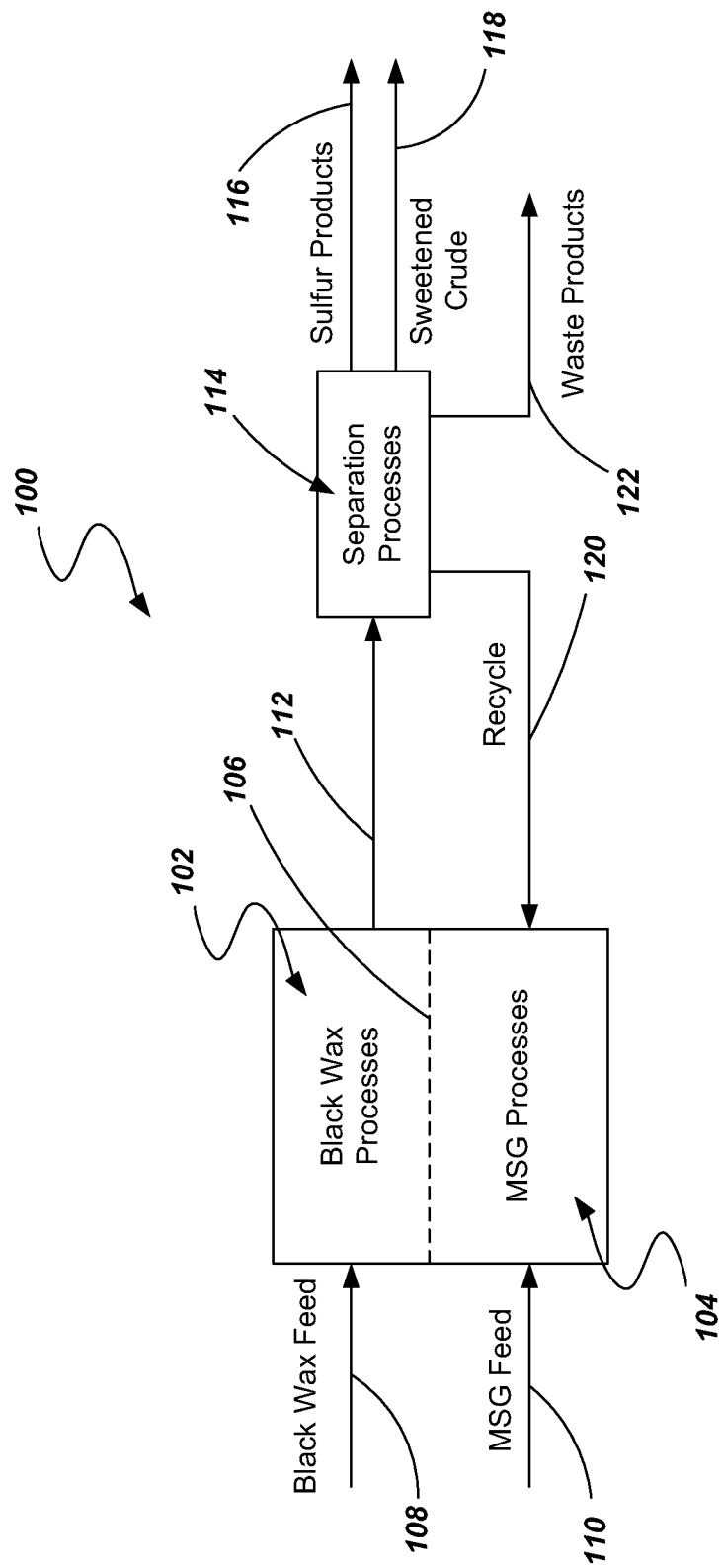
FIG. 1 is a block diagram showing an overview of a hydrocarbon upgrade system and process according to an embodiment of the present invention.

Referring to FIG. 1, a flow chart shows a system and process 100 that includes an integrated hydrocarbon upgrade process 102 and a molten salt gasification (MSG) process 104. It is noted that the hydrocarbon upgrade process 102 is shown as a black wax process. However, other hydrocarbon upgrade processes may be used in place of the black wax process depending, for example, on the hydrocarbon materials available and the operating parameters of the MSG process 104. As such, the use of black wax in the example embodiments should not be considered to be limiting.

Inputs into the process 100 may include a hydrocarbon source, such as a black wax feed 108 and a molten salt gasification feed 110. The output 112 of the hydrocarbon upgrade process 102 is subjected to one or more separation processes 114 which may produce, for example, sulfur products 116, a sweetened crude product 118, a recycle stream 120 and waste products 122. The waste products 122 may include, for example, high value metals and other materials that have lesser value and are not useful in the upgrade process 100. The recycle stream 120 may be fed back, for example, to the MSG process 104 for further digestion of the materials.

The hydrocarbon upgrade process 102 and the MSG process 104 may take place in an intimate pressurized environment with a gaseous transfer separation device 106 incorporated into the system or process 100. Such a configuration provides for improved thermal efficiency. Additionally, the ability to recycle materials that might otherwise be considered a waste stream back into the MSG process 104 provides added efficiencies. Such integration helps to conserve water and capture carbonaceous streams for increased effectiveness in the production of hydrogen and utilization of the feedstock.

Figure 2:
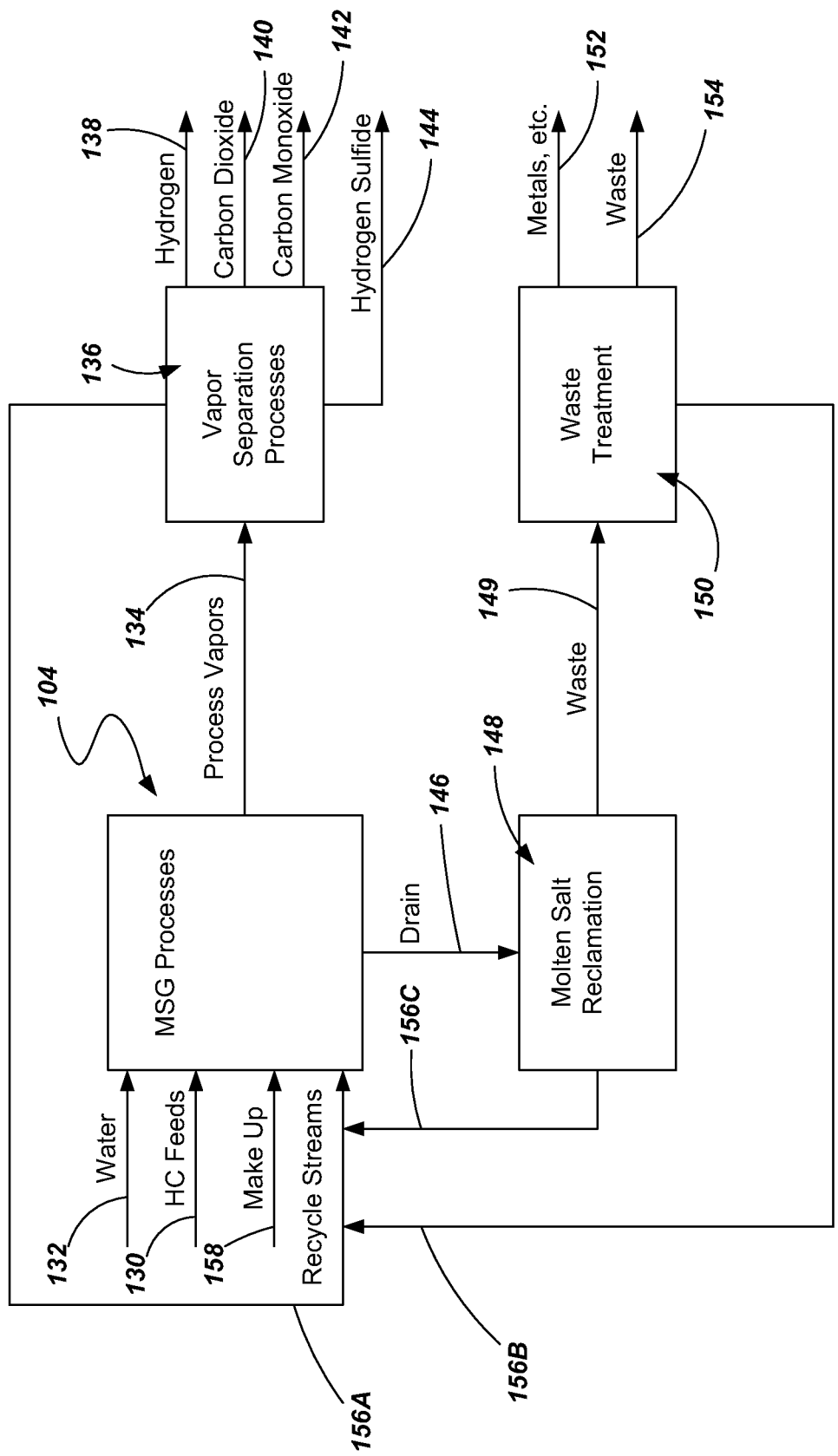
FIG. 2 is a block diagram showing a portion of the system/process shown in FIG. 1.

Referring to FIG. 2, a flow diagram shows a basic MSG process 104 that may be used in the process described in FIG. 1. The MSG process 104 includes several feeds or inputs including a hydrocarbon feed 130, which provides one or more carbonaceous materials, and a water feed 132. These materials are combined with molten alkaline salts in an environment of heat and pressure to produce process vapors 134 that may include a variety of constituents such as hydrogen, water, carbon monoxide, carbon dioxide and hydrogen sulfide. The gas products are subjected to a separation process 136 to provide purified output streams such as a hydrogen stream 138, a carbon dioxide stream 140, a carbon monoxide stream 142 and a hydrogen sulfide stream 144.

The molten salt collects nongaseous materials that may require removal at a rate that is dependent upon the composition of the hydrocarbon feed streams 130. Non-gaseous components may be removed through a drain 146 to a molten salt reclamation process 148. The molten salt reclamation process 148 produces a waste stream 149 that may contain numerous metals and other products. A waste treatment process 150 may be used to separate the various components into one or more metals streams 152 and a waste stream 154 and the metals may be further refined if desired. The molten salt reclamation process 148 recycles reclaimed salt products back into the process. Various recycle streams coming from different sources are shown at 156A, 156B and 156C. It is noted that, while these recycle streams are shown as being combined prior to entry back into the MSG process, they can be arranged to enter the MSG process independent of one another as may be appropriate. A make up stream 158 may provide additional salt materials when the levels of the molten salts become insufficient within the MSG process 104.

Various examples of MSG processes, systems and related components are set forth in U.S. patent application Ser. No. 13/188,121, filed Jul. 21, 2011, Ser. No. 13/188,167, filed Jul. 21, 2011, Ser. No. 13/188,202 filed Jul. 21, 2011, the disclosures of each of which are incorporated by reference herein in their entireties.

Figure 3:
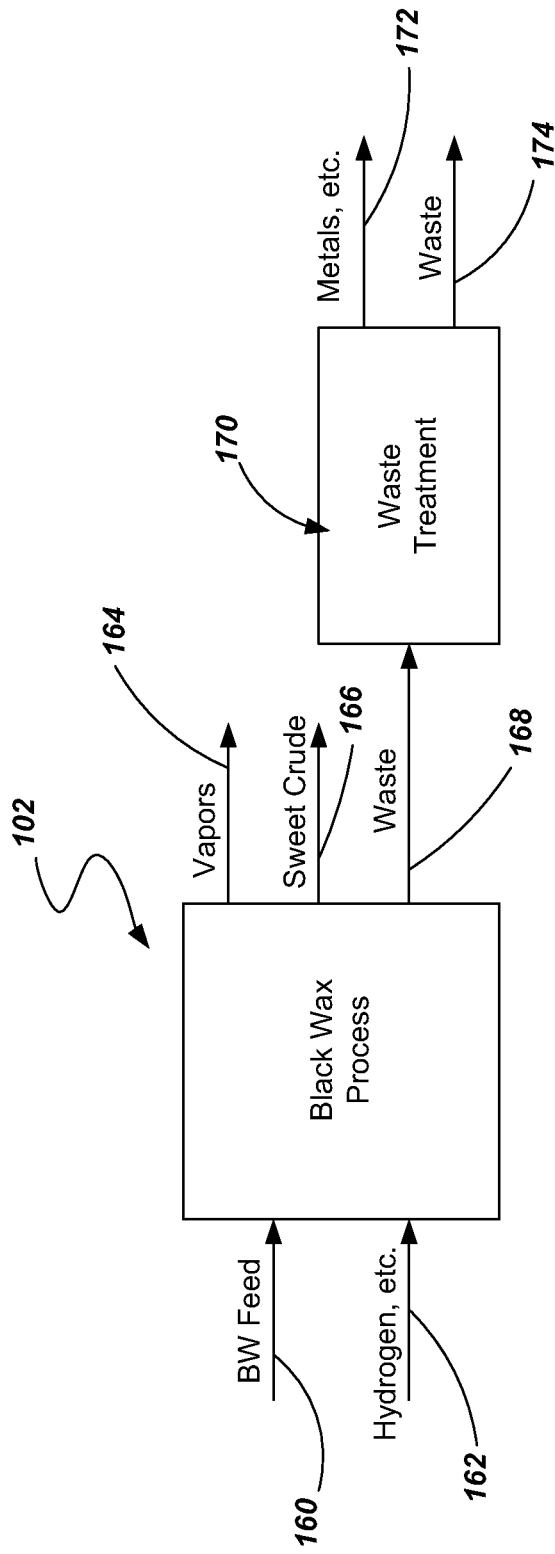
FIG. 3 is a block diagram showing another portion of the system/process shown in FIG. 1.

Referring briefly to FIG. 3, a basic flow chart is shown for a black wax upgrade process 102. The upgrade process 102 takes in a black wax feed stream 160 and feed stream of hydrogen 162 and/or other process materials. During the upgrade process 102, the black wax (or other carbonaceous material) is subjected to high-temperature and high-pressure conditions in the presence of a catalyst to break the long chain molecules of the black wax into shorter chains which react with the hydrogen resulting in a lighter hydrocarbon product. Thus, the upgrade process 102 produces several output streams such as a vapor stream 164, a product stream 166 of a lightened, sweet crude, and a waste stream 168. The waste stream 168 feeds into a waste treatment process 170 which provides a product stream 172 of metals and other materials of value. The ultimate waste stream 174 may be disposed of or subjected to further treatment if desired.

The product stream 166 provides an upgraded hydrocarbon material that is more easily transported for subsequent use and processing. For example, the product stream 166 may provide a sweetened crude that remains fluid at temperatures as low as approximately 10° C. In contrast, black wax crude is a material that is difficult to transport long distances and can only travel for a time period of approximately 4 to 8 hours in an insulated tanker before solidifying. If the black wax solidifies before arriving at its destination, reheating is required in order to get the black wax to flow out of the tanker.

Figure 4:
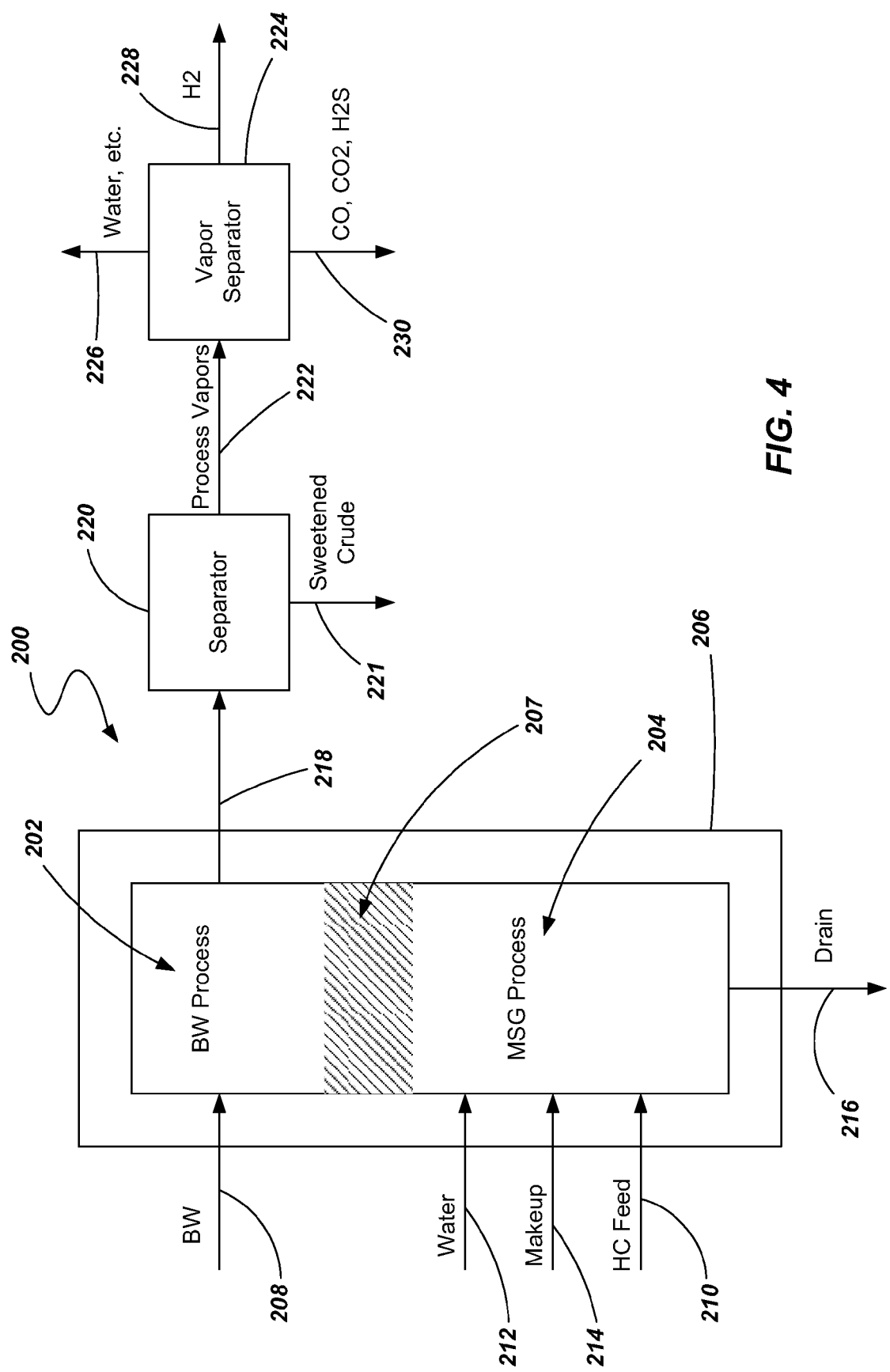
FIG. 4 is schematic of a hydrocarbon upgrade system in accordance with an embodiment of the present invention.

Referring now to FIG. 4, a system 200 is shown that integrates the upgrade process and the MSG process into the process 100 generally shown in FIG. 1. A subsystem 202 is configured to conduct the black wax upgrade process and another subsystem 204 is configured to conduct the MSG process. Both subsystems (other than input and output streams) are located within a common pressure boundary 206, such as a pressure vessel. A gaseous transfer interface 207 separates the upgrade process and the MSG process within the pressure boundary 206. The intimacy of the two processes and their associated subsystems 202 and 204 will enable a greater degree of thermal efficiency and energy management in the overall process 100. It is noted that, for purposes of clarity and simplicity, various make up feeds and recycle loops are not shown in FIG. 4, though water and gases (e.g., hydrogen) may be continually recycled to maintain an economic and an environmental benefit during the operation of the system.

The system 200 includes various feed streams including a black wax feed stream 208 supplying feed material into the black wax upgrade subsystem 202. Additionally, a hydrocarbon stream 210, a water stream 212 and a make up stream 214 provide the process materials to the MSG subsystem 204. Hydrogen may be provided to the black wax upgrade subsystem 202 from MSG subsystem 204 as one of the various products of the MSG process.

Non-gaseous materials exit the pressure boundary 206 from the MSG process through a drain or output stream 216 and may be collected, reprocessed and/or recycled. A vapor stream 218 exits the pressure boundary 202 from the black wax upgrade subsystem 202 and enters a separator 220. The separator separates the products in the vapor stream into an upgraded hydrocarbon stream 221 (e.g., sweetened crude) and a process vapor stream 222. The upgraded hydrocarbon material is collected for subsequent use or processing while the process vapor 222 passes to one or more vapor separators 224. The vapor separator 224 may produce a variety of product streams including, for example, a water stream 226, a hydrogen stream 228, and one or more streams 230 containing constituents such as carbon monoxide, carbon dioxide, and/or hydrogen sulfide.

Figure 5:
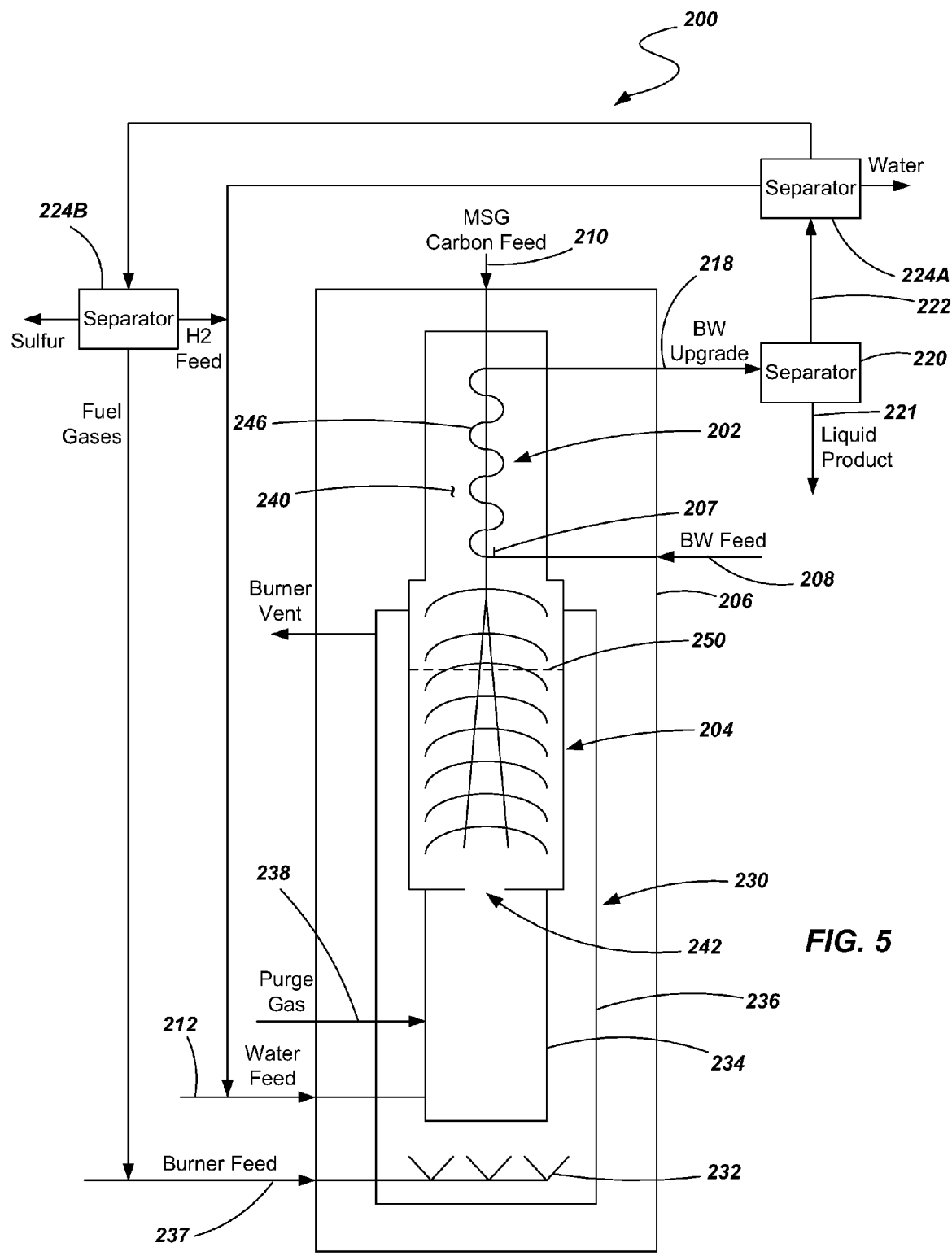
FIG. 5 is schematic of a hydrocarbon upgrade system in accordance with an embodiment of the present invention.

Referring to FIG. 5, the system 200 is shown with additional hardware components. While FIG. 5 shows additional hardware, for the sake of simplicity and clarity, various recycle streams, make up feeds and other components known in the art are not explicitly shown. As described in association with FIG. 4 above, the system 200 includes a black wax upgrade subsystem 202 and an MSG subsystem 204 located within a common pressure boundary 206 such as a pressure vessel. A heating subsystem 230 provides the necessary thermal energy to the processes. In one embodiment, the heating subsystem 230 is configured as an indirect fired system having a burner 232 and a boiler 234. However, in other embodiments, a direct fired heating system may be used.

An enclosure 236 associated with the burner 232 surrounds both the boiler 234 and the molten salt end of the MSG subsystem 204. Initially, during start-up of the system 200, one or more feed streams 237 provide streams of fuel and oxidizer (e.g., natural gas and air) to the burner 232 for combustion. The hot products of combustion are circulated by forced convection around the boiler 234 and MSG subsystem 204 to provide heat for the MSG process as well as for the black wax upgrade process. A purge gas 238, such as argon, is heated within the boiler 234 at a predetermined startup pressure. Depending on the porosity of the solid phase salt used in the MSG process, the purge gas may or may not flow through a gaseous transfer interface 242 and through solid phase salt into a vapor chamber 240 of the MSG subsystem 204. If there is no initial flow of purge gas (e.g., due to the lack of porosity of the solid phase salt), the boiler 234 and the salt of the MSG process will initially be heated by conduction through the vessel boundary of the MSG subsystem 204 until the salt attains a sufficiently molten state to permit purge gas flow therethrough. The hot purge gas then flows and further heats the salt to a desired operating temperature.

In one embodiment, gases within the vapor chamber 240 of the MSG subsystem 204 are vented by passing them through a second gaseous transfer interface 207 associated with a coiled tube 246 in the vapor chamber 240. The coiled tube 246 is also connected to, and in selective fluid communication with, the black wax feed 208. The gases exit the pressure boundary 206 by way of the coiled tubing 246 and are discharged externally. In another embodiment, the gases may be vented from the vapor chamber 240 through a dedicated vent line that may be selectively opened and closed during various stages of operation.

Once the desired operating temperature of the molten salt and vapor chamber 240 is achieved, the purge gas 238 is replaced by a flow of water and/or steam 212. The steam is superheated in the boiler 230 at a predetermined pressure and allowed to flow through the molten salt and through the external separation and heat management systems to bring other system components to desired operating temperatures and pressures. The desired operating temperatures and pressures of the system will be determined by a variety of variables including salt properties, elemental and molecular feedstock composition, and the desired composition and physical properties of the resultant product.

Upon reaching physical operating conditions, the hydrocarbon feed 210 is introduced into the MSG subsystem 204 in accordance with a specified startup flow profile. Assuming an example where sodium salts are utilized, the hydrocarbon feed 210 is introduced below the surface 250 of the molten salt where the pyrochemistry occurs between steam, carbon feed, sodium carbonate, and sodium hydroxide. Of course other salts may be used which would alter the chemistry of the process as will be appreciated by those of ordinary skill in the art. Using sodium salts, the main product of this chemistry is a gas stream composed predominantly of water vapor, hydrogen, carbon monoxide, carbon dioxide, methane, and sulfur compounds (i.e. hydrogen sulfide). All other product streams are liquid or solid in nature and remain in the molten salt where other methods of extraction are employed. The gas products are captured in the vapor chamber 240 of the system 200 where it is forced to leave by passing through a gaseous transfer interface mechanism 207 into the black wax upgrading subsystem 202.

The black wax upgrade subsystem 202 is largely contained within the vapor chamber 240 of the MSG subsystem 204 as represented by the coiled tubing 246 in FIG. 5. Part of the length of the coiled tubing 246 is constructed with a gaseous transfer interface 207 such that a pressure differential between the inside of the coiled tubing 246 and the outside of the coiled tubing causes gases to flow from the vapor chamber 240 through openings in the wall of the coiled tubing 246 (which serve as the gaseous transfer interface) to the inside of the coiled tubing 246. In one embodiment, the flow of gases from the vapor chamber 240 through the gaseous transfer interface 207 into the coiled tubing 246 may be controlled largely by temperature, pressure differentials and gravity (e.g., location of the openings in the coiled tubing 246). In other embodiments, the flow of gases into the coiled tubing may be controlled by appropriate mechanisms such as mechanical check valves that enable fluid to pass from the vapor chamber 240 into the coiled tubing 246 while prohibiting fluid flow in the reverse path.

Still considering the operation of the system 200, the black wax on the outside of the pressure boundary 206 is brought to an appropriate fluid temperature and introduced through the wall of the pressure boundary 206, flowing it toward the coiled tubing 246 inside of the vapor chamber 240. The black wax and the gaseous products commingle within the coiled tubing 246 and are continually mixed in an environment of elevated temperature and pressure and in the presence of appropriate catalytic agents. The kinetics of the black wax upgrade process may dictate the geometry of the hydrocracker (i.e., the coiled tubing 246) such as the tubing length, tubing diameter, number of coils, diameter of coils and number of tubes. Gravitational effects may determine whether flows are up or down or both depending on changes in density, mixing effectiveness, and viscosity. Additionally, it is noted that while shown as a single coiled tubing 246 in FIG. 5, multiple tubes may be employed for the mixing and hydrocracking of the black wax through the exposure of MSG gaseous products. In other embodiments, non-coiled configurations may be employed. For example, a non-coiled vessel fabricated from a porous metal may be utilized where the gases are enabled to pass through the porous metal walls of the vessel.

After sufficient process time, the upgraded BW and vapors present within the coiled tubing 246 exit the pressure boundary 206 as a mixed product/vapor output stream 218. Among other things, this output stream 218 provides significant heat management opportunity internal to the pressure boundary 206 as well as external to the pressure boundary within the system 200 depending on which separation techniques are utilized in the system 200. In one embodiment, as noted above, the liquid phase material is separated from the vapor phase in a separator 220.

In some embodiments, there may also be a need to perform a three phase separation where there are two liquid phases. If there is only one liquid phase, which would include refinery quality crude oil (e.g., product stream 221), it will be conveyed by an appropriate manner to a refinery for further processing. If there are two liquid phases, the second phase will most likely include water. As such, the liquid phases may be subjected to any of a variety of water/oil separation techniques as will be appreciated by those of ordinary skill in the art. In either case, the vapors are taken to another stage of separation. In certain embodiments, this might include an active or a passive separation of the remaining hydrogen from the other constituents. In other embodiments the hydrogen may be left in the stream. If the hydrogen is removed, it may be compressed to a desired pressure and recycled back into the system 200 to further assist with the process. For example, it may be introduced into the water/steam stream and be fed back into the boiler 234 to be reheated prior to finding its way back to the vapor chamber. Such recycling will maximize the efficiency of the hydrogen gas within the process and also provide heat management benefits through transfer of heat within the system 200.

In the next separation process, the upgrade gases may be separated so that sulfur is recovered by, for example, a Claus or any other appropriate process as will be appreciated by those of ordinary skill in the art. Should hydrogen remain in the upgraded gaseous product stream, it may go through a separation process that may or may not separate it from the other fuel gases. If it is not separated, it may be used within the system 200 as fuel gas for the burner 232. If hydrogen is separated from the other fuel gases, it can be recycled back into the upgrade process such as described above. The sulfur found in the feed streams for the gasification and upgrade processes may be removed in the form of hydrogen sulfide. Conventional refinery methods of separation and reduction to elemental sulfur or other useful compounds such as sulfuric acid may then be employed.

The integration of the upgrade process and the MSG process will achieve a more effective and efficient process for the upgrading of a carbonaceous resource. The integration provides an intimate sharing of pressure boundaries, thermal boundaries, and enhanced mass and heat transfer capabilities. Numerous benefits will result from such a system including improved energy efficiency and energy management, more effective gasification, and a smaller system footprint with lower overall operating costs than would be required by separate systems. Additionally, the ability to recycle various materials (e.g., carbonaceous material, water, salt, etc) will be improved with such an integrated system. Waste management will also be improved including the ability to harvest valuable metals and hydrogen materials from the waste streams (e.g., streams produced by the various separators 220, 224A and 224B).

Embodiments of the present invention also make it more economical to provide a useful and more easily transportable hydrocarbon material from an available resource, such as black wax, which is not as easily transported and less useful before processing in accordance with the present disclosure.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A system for upgrading hydrocarbon material, the system comprising:
a black wax upgrade subsystem;
a molten salt gasification (MSG) subsystem comprising a volume of molten salt and a vapor chamber located above the volume of molten salt;
a heating subsystem comprising a boiler positioned below the volume of molten salt;
a first gaseous transfer interface between the boiler and the volume of molten salt; and
a second gaseous transfer interface between the black wax upgrade subsystem and the MSG subsystem.

2. The system of claim 1, wherein the MSG subsystem, the black wax upgrade subsystem and the heating subsystem are contained within a common pressure boundary.

3. The system of claim 2, wherein the black wax upgrade subsystem includes coiled tubing located within the vapor chamber.

4. The system of claim 3, wherein the heating subsystem further includes a burner.

5. The system of claim 4, wherein the boiler substantially surrounds the volume of molten salt.

6. The system of claim 3, wherein the second gaseous transfer interface is defined, at least in part, by one or more openings in the coiled tubing.

7. The system of claim 6, wherein the second gaseous transfer interface includes at least one check valve associated with the coiled tubing.

8. The system of claim 1, further comprising at least one separator configured to process an output stream from the black wax upgrade subsystem.

9. The system of claim 8, wherein the at least one separator is configured to separate a liquid phase from a gaseous phase.

10. The system of claim 8, wherein the at least one separator is configured to separate a first gaseous constituent from a second gaseous constituent.

11. The system of claim 8, further comprising a recycle stream from the at least one separator configured to return a fluid material to at least one of the black wax upgrade subsystem and the MSG subsystem.

12. A system for upgrading hydrocarbon material, the system comprising:
a black wax upgrade subsystem;
a molten salt gasification (MSG) subsystem including a volume of molten salt and a vapor chamber located above the volume of molten salt, wherein the black wax upgrade subsystem and the MSG subsystem are contained within a common pressure boundary;

a gaseous transfer interface between the black wax upgrade subsystem and the MSG subsystem;

wherein the black wax upgrade subsystem includes coiled tubing located within the vapor chamber.

13. The system of claim 12, wherein the gaseous transfer interface is defined, at least in part, by one or more openings in the coiled tubing.

14. The system of claim 13, wherein the gaseous transfer interface includes at least one check valve associated with the coiled tubing.

15. The system of claim 12, further comprising at least one separator configured to process an output stream from the black wax upgrade subsystem.

16. The system of claim 15, wherein the at least one separator is configured to separate a liquid phase from a gaseous phase.

17. The system of claim 15, wherein the at least one separator is configured to separate a first gaseous constituent from a second gaseous constituent.

18. The system of claim 15, further comprising a recycle stream from the at least one separator configured to return a fluid material to at least one of the black wax upgrade subsystem and the MSG subsystem.

* * * * *